United States Patent [19]

Takeshita et al.

[11] 4,207,744
[45] Jun. 17, 1980

[54] SOLAR REFRIGERATION SYSTEM

[75] Inventors: Isao Takeshita; Nobuhiko Wakamatsu; Eiji Ando; Hiroyoshi Tanaka, all of Kadoma, Japan

[73] Assignee: Matsushita Electric Industrial Company, Limited, Osaka, Japan

[21] Appl. No.: 899,104

[22] Filed: Apr. 19, 1978

[30] Foreign Application Priority Data

Apr. 20, 1977 [JP] Japan .................................. 52-56262

[51] Int. Cl.² .................. F25B 27/00; F25B 15/00
[52] U.S. Cl. ........................................ 62/2; 62/148; 62/476; 126/442
[58] Field of Search .................. 62/2, 148, 476; 126/271

[56] References Cited

U.S. PATENT DOCUMENTS

| | | | |
|---|---|---|---|
| 4,062,489 | 12/1977 | Henderson | 62/2 |
| 4,096,861 | 6/1978 | Bowles | 126/271 |
| 4,100,756 | 7/1978 | Albertson | 62/2 |
| 4,121,568 | 10/1978 | Olsen | 126/271 |
| 4,126,014 | 11/1978 | Kay | 62/2 |

FOREIGN PATENT DOCUMENTS 1029398  5/1958  Fed. Rep. of Germany .................. 62/2

OTHER PUBLICATIONS

"Combining the Collector and Generator of a Solar Refrig. System" *The American Society of Mechanical Engineers,* 76 WA/Sol.-4, Nov. 1967.
*Refrigeration and Air Conditioning,* Jun. 1977, p. 43.

*Primary Examiner*—Lloyd L. King
*Attorney, Agent, or Firm*—Lowe, King, Price & Becker

[57] ABSTRACT

The present invention relates to an improvement of a solar refrigeration system. The solar refrigeration system has been improved by combining a solar collector-generator and a heat exchanger into one unit to increase the performance efficiency of the system by eliminating heat losses. The solar collector-generator comprises a tube and header arrangement including a plurality of double-walled tubes, each consisting of an outer pipe and an inner pipe, the inner pipe defining a passage for a high temperature refrigerant-lean or weak solution, whereas, the outer and inner tubes defining therebetween a passage for a low temperature refrigerant-rich or strong solution.

5 Claims, 4 Drawing Figures

SOLAR REFRIGERATION SYSTEM

BACKGROUND OF THE INVENTION

The present invention relates to solar refrigeration systems.

Energy produced by cheap fuels, on which a civilized society of today is based, are most likely to start to run out. Thus, methods of and apparatuses for directly using limitless solar energy are attracting our attention. A considerably large portion of a total of consumption of energy for public's livelihood consists of energy consumption for air conditioning and that for freezing of perishable foods. Apparently, if solar energy can be used for producing a low temperature, the energy we need for air conditioning and freezing, which is currently given by fossil fuels such as an oil, will be partly or wholly replaced by solar energy and the fossil fuels can be conserved. To accomplish this, a system in which a steam generated by solar heat is used to operate a steam engine that drives a compressor and another system in which a hot water heated by solar radiation is used to operate an absorption refrigeration system have been devised. In the latter case, problems encountered in practical applications were solved with the existing techniques.

A conventional absorption refrigeration system with solar energy employing a solar collector-refrigerant gas generator is disclosed on page 43 of "Refrigeration and Air Conditioning June 1977" and will be explained hereinafter in connection with FIG. 1.

In FIG. 1, the reference numeral 1 denotes a solar collector which serves as a refrigerant gas generator also. The reference numeral 2 denotes a top header or a vapor liquid separator in which vapor and liquid are separated; the reference numeral 3 denotes a condenser; the reference numeral 4 denotes an expansion valve; the reference numeral 5 denotes an evaporator; the reference numeral 6 denotes a refrigerant gas absorber; the reference numeral 7 denotes a pump; the reference numeral 8 a heat exchanger; the reference numeral 9 denotes a conduit for refrigerant gas; and the reference numeral 10 a conduit for a weak solution containing a low concentration of refrigerant gas. This system operates as follows: rich solution containing a high concentration of refrigerant gas dissolved therein flows into the solar collector-generator 1 from its lower end and the rich or concentrated solution is heated with solar radiation high enough as to release the refrigerant vapor, thus becoming the weak spent or dilute solution. In the top header 2 connected to the upper end of the solar collector-generator 1, the vapor gas is separated from the liquid. The refrigerant gas flows from the top header 2 to the condenser 3 through the conduit 9 for condensation. The condenser 3 is cooled with cooling water or air. The thus formed liquid refrigerant expands in the expansion valve 4 from the high-pressure level in the condenser 3 to the low-pressure level in the evaporator 5. In the evaporator 5 the liquid refrigerant boils at low temperature to produce cooling. The gaseous refrigerant flows from the evaporator 5 to the absorber 6. The weak solution separated from the refrigerant vapor in the top header 2 flows through the conduit 10 into the heat exchanger 8 where it gives heat to the relatively low temperature rich solution passing through the heat exchanger 8. The thus cooled weak solution flows from the heat exchanger 8 into the absorber 6 where it absorbs the refrigerant gas to become the rich solution. Because the absorber 6 is cooled with cooling water or air, the temperature of the rich solution is as low as that of the cooling water or air. Because the pressure of the rich solution in the absorber 6 is lower than the pressure thereof in the collector 1, the pump 7 is provided to pump the rich solution toward the collector 1.

The thermal efficiency of such an absorption refrigeration system as previously described largely depends on the efficiency of heat exchange between the rich solution and the weak solution. Thus to increase the thermal efficiency of the system the temperature of the rich solution as it enters the solar collector 1 must be raised with the heat exchange process between the rich solution and the weak solution. For this it is necessary to eliminate heat losses by thermally insulating the top header 2, the conduit 10 between the top header 2 and the heat exchanger 8, and the heat exchanger 8 per se in addition to increasing the effective area through which the heat is transferred in the heat exchanger 8. This part of the cycle is the highest in temperature and thus the heat is most likely to be lost. As described above, the conventional refrigeration system shown in FIG. 1 has a shortcoming that the thermal efficiency is not high enough.

SUMMARY OF THE INVENTION

It is therefore an object of the invention to eliminate the above mentioned shortcoming encountered in the conventional refrigeration system.

According to the invention, the above mentioned shortcoming has been eliminated by combining a heat exchanger and solar collector-generator into one unit for eliminating heat losses.

One feature of the invention resides in the construction of a solar collector-generator which has the function of heat exchange between the rich solution and the weak solution. The solar collector employs a double-walled tube including an inner pipe and a concentric outer pipe jacketing the inner pipe, the inner pipe defining a passage for the weak solution, whereas, the outer and inner pipes defining therebetween a passage for the rich solution. Since the rich solution flowing through the outer tube is heated not only with solar radiation but also with the heat of the weak solution flowing through the inner tube, the temperature of the rich solution as it flows up to the top header of the solar collector-generator will rise to a sufficiently high level.

DESCRIPTION OF THE PREFERRED EMBODIMENT

The present invention will be further described hereinafter in connection with FIGS. 2, 3 and 4.

Figure 4:
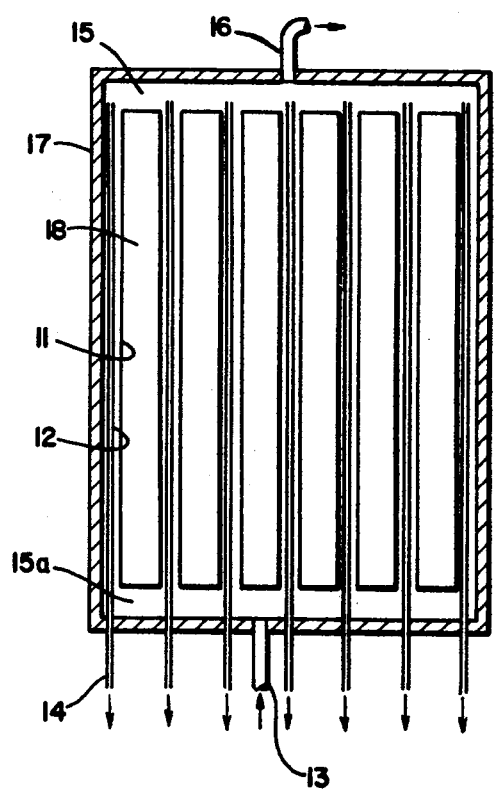
FIG. 4 is a sectional view taken along the section line IV—IV of FIG. 2.

Referring to FIG. 4, a solar collector-generator, generally denoted by the reference character A, comprises a tube and header arrangement which comprises a plurality of concentric double-walled tubes arranged in parallel, each tube consisting of an outer pipe 11 and an inner pipe 12 jacket by the outer pipe 11, and it has functions of a solar collector, refrigerant gas generator, and heat exchanger between a low temperature rich solution and a high temperature weak solution used in the refrigeration system. Denoted by the reference numeral 13 is an inlet for the rich solution; the reference numeral 14 denotes an outlet for the weak solution; the reference numeral 15 a top header or a vapor liquid separator; the reference numeral 16 denotes a refrigerant gas conduit; the reference numeral 17 denotes a thermal insulator; and the reference numeral 18 denotes a glass plate. The insulator 17 is disposed at the back of the tube and header arrangement and thermally insulates especially the top header 15. A bottom header 15a is not necessary insulated. FIG. 2 corresponds to FIG. 4 except that only one concentric double-walled tube is shown.

Figure 2:
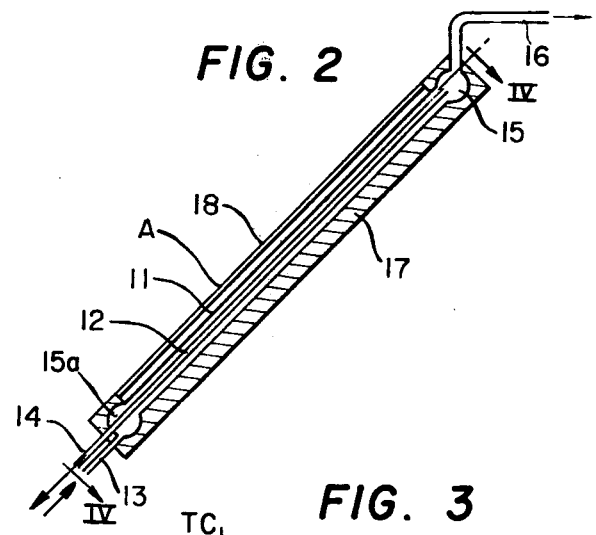
FIG. 2 is a longitudinal sectional view of preferred embodiment of a solar collector-refrigerant gas generator, into which a heat exchanger between the rich and weak solutions is combined, for a solar refrigeration system.

In operation, a rich solution with a relatively low temperature will be pumped to flow from the inlet 13 upwards through an annular passage formed between the outer pipe 11 and the inner pipe 12, viewing in FIG. 2. The rich solution flowing through the solar collector A will receive heat from the solar radiation and also from a high temperature weak solution flowing through the inner pipe 12, and will boil to release refrigerant vapor. The refrigerant vapor thus released will be separated from the liquid in the top header 15 and then will be transferred to a condenser of the associated refrigeration system (not shown) for condensation.

The resulting spent weak or dilute solution flows downwards from the top header 15 through the inner pipe 12 because the inner pipe 12 has an upper end opening to the top header 15. While flowing through the inner pipe 12, the weak or dilute solution gives its heat to the rich or concentrated solution flowing around the inner pipe 12 and the thus cooled weak solution will flow out of the solar collector-generator A via the outlet 14 toward an absorber (not shown) in which the weak or dilute solution will absorb the refrigerant gas to become the rich or concentrated solution again.

Because the inner pipe 12 is open directly to the top header 15, the weak solution in the top header 15 having increased, in temperature, to its peak value is used without any heat loss to heat the rich solution flowing through the passage formed between the outer pipe 11 and the inner pipe 12. Since the rich solution flowing through the passage between the outer pipe 11 and the inner pipe 12 receives heat not only from solar radiation but also from the weak solution flowing through the inner pipe 12, the thermal efficiency of the absorption refrigeration system will increase.

The thermal efficiency of the refrigeration system largely depends upon how effectively the sensible heat of the weak solution can be utilized for heating the rich solution. Since according to the invention, the inner pipe 12 through which the weak solution will flow right after leaving the top header 15 is jacketed by or surrounded by the annular passage, formed between the outer and inner pipes 11 and 12, through which the rich solution will flow, the sensible heat of the weak solution will be fully utilized for heating the rich solution by heat exchange process. As a result, under the same concentration of sun rays, there is an increase, in quantity, of refrigerant vapor generation according to the invention.

The detailed construction of the solar collector-generator A will be described. A copper pipe with an outer diameter of ⅜ in. and a length of 7.2 ft. and a copper pipe with an outer diameter of ¼ in. are used for the outer and inner pipes 11 and 12, respectively, of each double-walled tube. A stainless steel pipe with an outer diameter of 60 mm is used for the top header or separator 15 and a copper pipe with an outer diameter of 1 in. is used for the bottom header 15a. Ten double-walled tubes are arranged in parallel between the top and bottom headers 15 and 15a and this tube and header arrangement is accommodated in a 7.5 ft. by 3 ft. casing. A sheet of rigid urethane foam with a thickness of 2 in. is used for the insulator 17.

Figure 1:
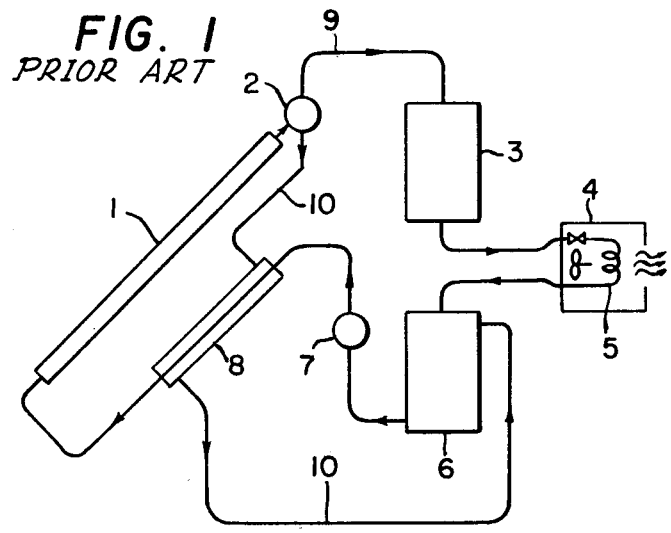
FIG. 1 is a system diagram of the conventional solar refrigeration system discussed before.
Figure 3:
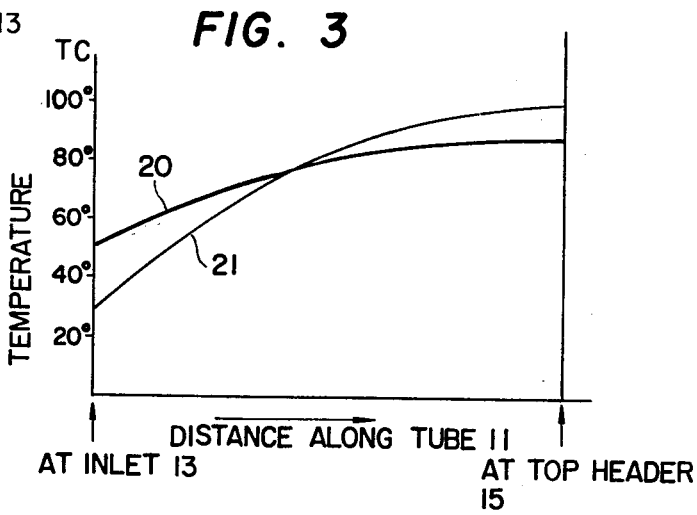
FIG. 3 is a graph of a curve showing the variation in temperature of the rich solution flowing through the conventional solar collector-refrigerant gas generator shown in FIG. 1 and a temperature variation curve of the strong solution flowing through the solar collector-refrigerant gas generator of the invention.

Referring to the graph shown in FIG. 3, a curve 21 represents temperature variations (T°C.) of the rich solution flowing between the outer and inner pipes 11 and 12 as against the distance (l) from the inlet 13 along the outer pipe 11 obtained in the solar collector-generator of the invention, whereas, a curve 20 represents the temperature variations obtained from the conventional solar collector-generator (see FIG. 1). Test conditions are as follows: Freon-22 ($CHClF_2$) was used as refrigerant; Dimethylformamide was used as absorbent; and the concentration of the rich solution was about 69%. The temperature of the rich solution at the inlet 13 was 30° C. although this temperature may vary according to the variations in the temperature of the cooling water used in the absorber. The incident solar energy was about 600 Kcal/$m^2$ and the flow rate of the liquid was 300 cc/min. When the solar collector-generator of the invention was used the peak temperature measured in the liquid of the top header 15 reached about 100° C.

When the conventional solar collector-generator was used, the temperature of the rich solution at an inlet of the collector-generator had already reached up to about 50° C. since the rich solution is already heated in a separate heat exchanger. The liquid temperature subsequently reached a peak of 88° C. after being heated with solar radiation.

The comparison between the curves 20 and 21 indicates that the mean temperature in the solar-collector of the invention is lower than in the conventional solar-collector. In the solar collector-generator of the invention, the peak temperature has increased by 12° C. but the mean temperature has decreased by 40° C. as compared to the conventional solar collector-generator. This means that the heat collection rate of a collector-generator has increased from 0.55 (in the conventional case) to 0.6 according to the present invention. As a result, it has been recognized that the quantity of heat absorbed by the rich solution has increased and thus the peak temperature. According to the present invention, the heat collection efficiency has increased by 10%, the generated quantity of the refrigerant gas has increased from 106 g/min. (in the conventional case) to 140 g/min. and therefore the cooling effect has increased by about 30%.

It will be recognized that since the use of the solar collector-generator of the invention eliminates the use of a separate heat exchanger, the installation space for the heat exchanger which was necessary in the conventional case has been eliminated in a solar refrigeration system, thus providing a compact low cost solar refrigeration system.

What is claimed is:

1. In a solar refrigeration system
a solar collector-generator comprising:
a casing; and
a tube and header arrangement including a top header, a bottom header and a plurality of double-walled tubes arranged in parallel between said top and bottom headers, each of said double-walled tubes including an outer pipe and an inner pipe jacketed by said outer pipe, said inner pipe defining a passage for a high temperature weak solution, said outer and inner tubes defining therebetween a passage for a low temperature rich solution.

2. A solar refrigeration system as claimed in claim 1, in which
said outer pipe has at a lower end thereof an inlet for the entry of the rich solution and at an upper end thereof an outlet opening to said top header, and
said inner pipe has at an upper end thereof an inlet opening to said top header.

3. A solar refrigeration system as claimed in claim 1 or 2 including:
an insulator insulating said top header.

4. In a solar refrigeration system, a solar collector-generator comprising:
a casing;
a tube and header arrangement disposed in said casing including,
a plurality of first tubes for collecting and being heated by solar radiation; said first tubes extending between a top header and a bottom header to fluidly interconnect said top and bottom headers and being arranged in parallel; said bottom header being in fluid communication with a source of low temperature rich solution having a high concentration of refrigerant gas dissolved therein; said rich solution flowing from said bottom header to said top header in said plurality of first tubes and being heated in said plurality of first tubes, and separating upon being heated into said refrigerant gas, which is collected in said top header, and into a high temperature weak solution containing a low concentration of said refrigerant gas dissolved therein; and
a plurality of second tubes, each leading from said top header and disposed so as to pass through one of said first tubes for draining said high temperature weak solution away from said top header so that said low temperature rich solution is additionally heated by heat exchange with said high temperature weak solution.

5. A solar refrigerator system as claimed in claim 4, wherein said heating of said low temperature rich solution by said high temperature weak solution takes the form of a countercurrent heat exchange.

* * * * *